H. HERTZBERG & A. A. LOW.
ELECTRIC VAPORIZER FOR INTERNAL COMBUSTION ENGINES.
APPLICATION FILED FEB. 11, 1907.
909,896.
Patented Jan. 19, 1909
3 SHEETS—SHEET 2.
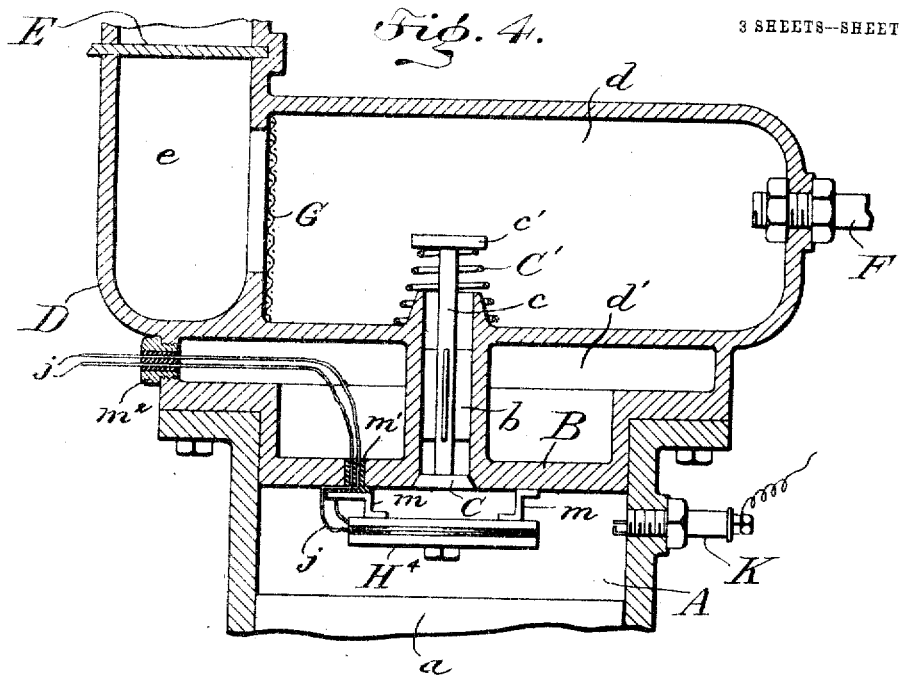
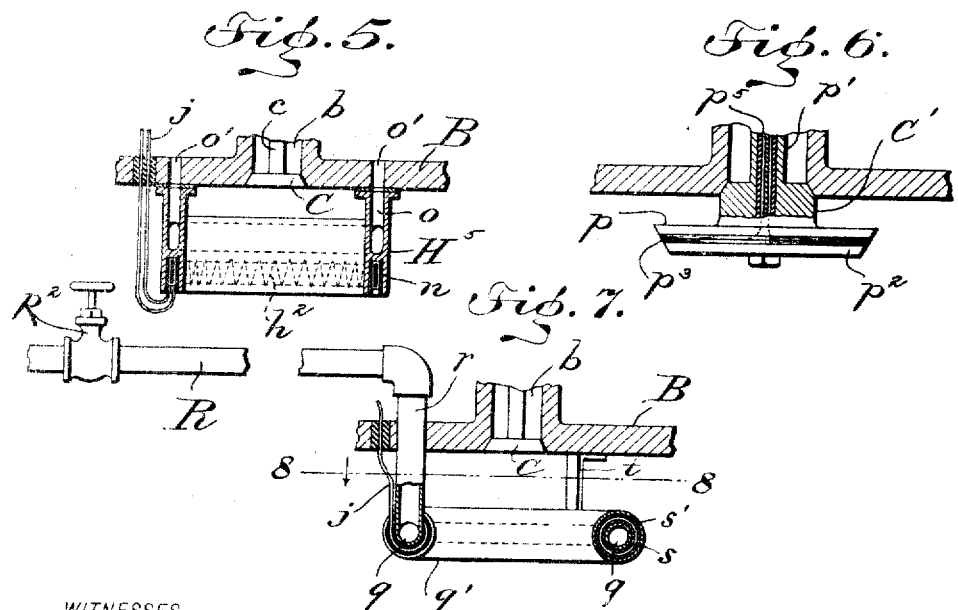

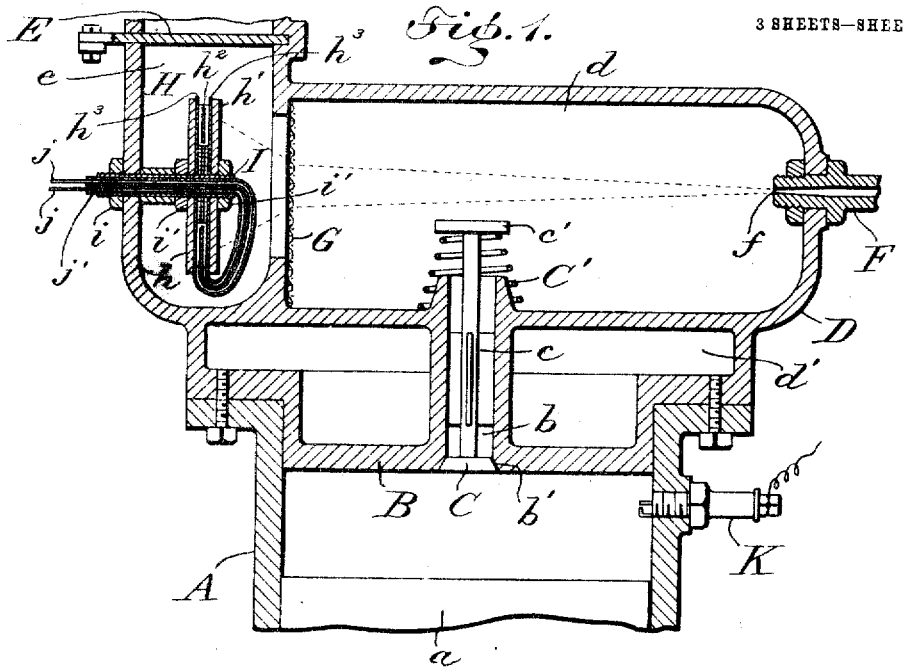
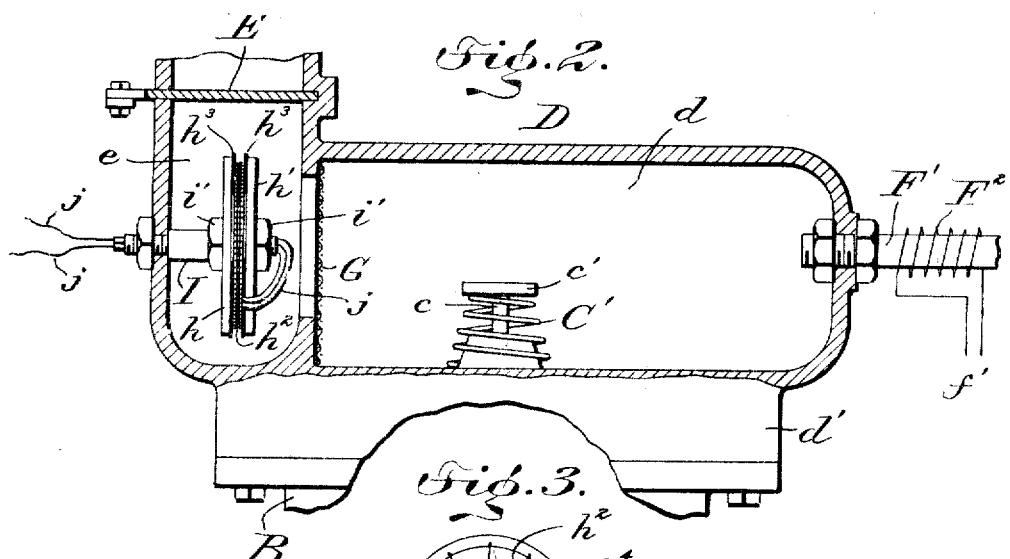
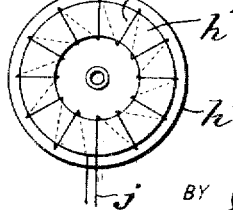

H. HERTZBERG & A. A. LOW.
ELECTRIC VAPORIZER FOR INTERNAL COMBUSTION ENGINES.
APPLICATION FILED FEB. 11, 1907.
909,896.
Patented Jan. 19, 1909.
3 SHEETS—SHEET 3.
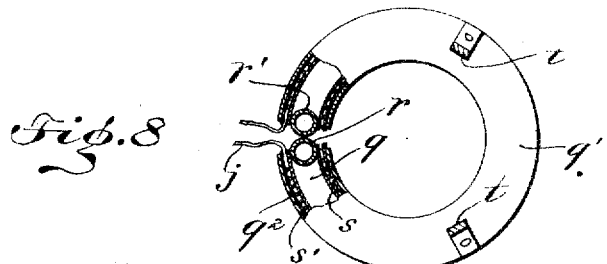
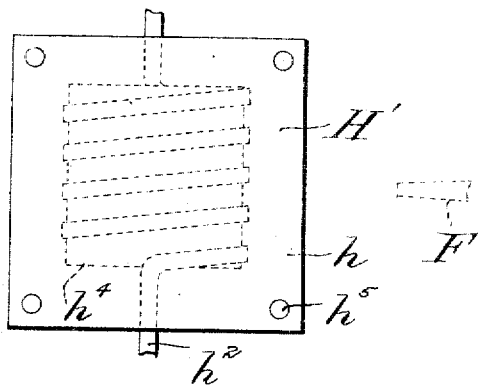
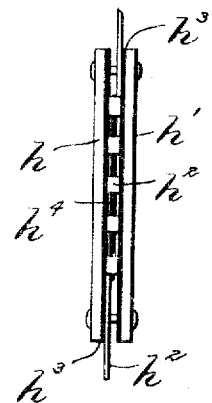
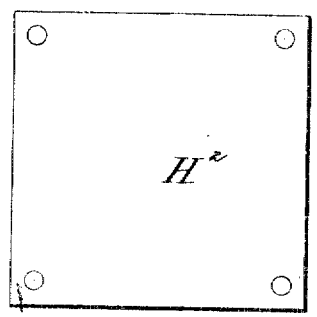
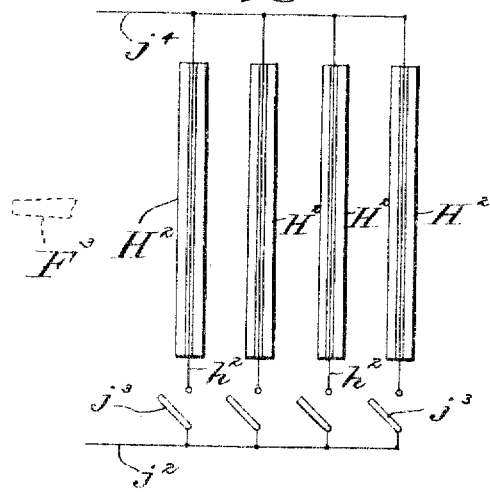
WITNESSES
H. C. Abbott
V. E. Nichols
INVENTORS
Harry Hertzberg
Abbot A. Low
BY Griffin & Bernhard
ATTORNEYS

UNITED STATES PATENT OFFICE.

HARRY HERTZBERG, OF NEW YORK, AND ABBOT AUGUSTUS LOW, OF HORSESHOE, NEW YORK; SAID HERTZBERG ASSIGNOR TO SAID LOW.

ELECTRIC VAPORIZER FOR INTERNAL-COMBUSTION ENGINES.

No. 909,896.  Specification of Letters Patent.  Patented Jan. 19, 1909.

Application filed February 11, 1907. Serial No. 356,792.

*To all whom it may concern:*

Be it known that we, HARRY HERTZBERG and ABBOT A. Low, citizens of the United States, residing at the city of New York, borough of Brooklyn, and State of New York, and Horseshoe, in the county of St. Lawrence, in the State of New York, respectively, have invented certain new and useful Electric Vaporizers for Internal-Combustion Engines, of which the following is a specification.

This invention is a vaporizer particularly adapted for use in internal combustion engines, the object in view being to quickly heat the surface against which the petroleum or other liquid combustible is sprayed in starting the engine. A sufficient temperature is produced in a very brief time to vaporize the liquid fuel, the resulting vapor being then mixed with air so as to produce the explosive charge.

The electrical device for heating the vaporizer is simple in construction, economical to manufacture and install, efficient in operation, and, also, particularly compact, it occupying very little space in the mixing chamber or combustion cylinder of the engine.

In the accompanying drawings, we have illustrated one practical embodiment of the invention, but the construction shown therein is to be understood as illustrative only, and not as defining the limits of the invention.

Figure 1 is a vertical section, with parts in elevation, showing a portion of an internal combustion engine equipped with a vaporizer adapted to be heated initially by an electric current as contemplated by this invention. Fig. 2 is a vertical section, partly an elevation, illustrating another embodiment of the invention wherein a somewhat different form of electrically heated vaporizer is employed, together with means for heating the spray nozzle through which the combustible liquid is supplied to the engine. Fig. 3 is a detail view in side elevation of the vaporizer shown in Fig. 2. Fig. 4 is a vertical section, partly an elevation, illustrating another embodiment of the invention wherein the electrically heated vaporizer is arranged in the combustion or piston chamber of the engine. Fig. 5 is a vertical section, in detail, of another form of electrically heated vaporizer adapted for use internally of the cylinder, said vaporizer being constructed for the circulation of a cooling medium therethrough when the engine is in operation. Fig. 6 is a detail view, partly in section and partly an elevation, showing our electrically heated vaporizer constructed to form a part of the intake valve of a combustion engine. Fig. 7 is a detail view illustrating a tubular jacketed, electrically-heated vaporizer adapted for use in substantially the same position as the vaporizer of Figs. 4, 5 and 6. Fig. 8 is a horizontal section on the line 8—8 of Fig. 7 showing the outer tube of a vaporizer broken away for illustrating the electrical resistance. Figs. 9 and 10 are views in side elevation and edge elevation, respectively, illustrating in detail one form of the new vaporizer. Figs. 11 and 12 are views in side elevation and edge elevation respectively, of a multiple unit vaporizer, each unit of which is heated electrically.

In Fig. 1 of the drawings we have shown one type of combustion engine wherein we may employ our vaporizer adapted to be heated initially by an electric current for the purpose of converting combustible liquid into vapor sufficient to start the engine into operation, after which the parts of the engine become heated to such an extent as to vaporize the combustible liquid and thereby insure the continued operation of said engine.

A designates a combustion chamber or piston cylinder, a part of the piston being indicated at $a$. One end of the cylinder is closed by a head B, in which is provided an intake passage $b$ adapted to be closed by an intake valve C. The valve is provided with a stem $c$ having a head $c'$ against which acts a spring C' that is adapted to hold the valve C normally on its seat $b'$ on the cylinder head.

A hood D is secured to the cylinder A and the head B in any usual or preferred way, and this hood is constructed to produce a mixing chamber $d$ and a circulating chamber $d'$, the latter being next to the head B and adapted to permit the circulation therethrough of a cooling medium, such as water. The hood D is shown as having an air inlet $e$ across which operates any suitable form of valve or regulator E adapted to control the volume of atmospheric air to be supplied to the mixing chamber $d$, the air so admitted by the valve or regulator E being adapted to mix with a combustible liquid, or a vapor produced by such liquid coming in contact with a vaporizer, as will hereinafter appear.

Any suitable means may be employed for supplying a combustible liquid to the chamber $d$, and such liquid may be of any suitable or preferred character, but in the engine shown by the drawing we contemplate the employment of kerosene which is vaporized to combine with air and thereby produce an explosive mixture which is admitted to the cylinder A.

A jet nozzle F is coupled or attached in a suitable way to the hood D, and as shown this nozzle is provided with a contracted orifice $f$ arranged to throw a jet of combustible liquid across the chamber $d$ and through a diaphragm G. Said diaphragm may be of any suitable nature, but as shown it consists of a piece of metallic gauze arranged vertically within the chamber $d$ and in the path of the jet of liquid from the nozzle F, whereby the diaphragm is adapted to break up the jet of liquid and convert the same into a fine spray, such liquid spray striking against or being brought into contact with the vaporizer of this invention when the engine is started. It should be understood that the jet of combustible liquid is forced under pressure, and at intervals, into the chamber $d$ by a suitable mechanical appliance, such as a pump, whereby the liquid is projected through the gauze diaphragm and is caused to strike the vaporizer.

One form of vaporizer is shown at H in Fig. 1 as being located in the air inlet passage $e$ and quite close to the diaphragm G, said vaporizer H being in the path of the jet of liquid adapted to be supplied by the nozzle F. This vaporizer consists of a plurality of masses of metal $h\ h'$, an electrical resistance $h^2$ and electrical insulating layers $h^3$. The vaporizer shown in Figs. 1, 2 and 3 of the drawings is circular or disk shape, whereas the vaporizer shown in Figs. 9 and 10 is square, but it will be understood that the shape of the vaporizer is unimportant. The electrical resistance $h^2$ may, and preferably does, consist of a fine metallic wire or ribbon which is preferably wound or coiled on the core $h^4$, said resistance being wound non-inductively on said core. The layers $h^3$ of insulating material are preferably thin pieces of mica which are disposed in direct contact with the masses of metal $h\ h'$. The resistance $h^2$ and its core $h^4$ are placed between the insulating layers $h^3$, and the parts are clamped or held firmly together so that the resistance will be in direct contact with the insulating layers, and said layers will in turn be in direct contact with the metallic masses. The members $h\ h'$ of the vaporizer are preferably composed of copper plates, which metal we have found will heat up readily when a current of electric energy is passed through the resistance $h^2$, whereby the heat developed in the resistance will be transmitted quickly to and absorbed by the metal masses $h\ h'$. The members $h\ h'$ may be held laterally together and upon the insulating layers of the resistance in any suitable or appropriate way, but as shown by Fig. 1 we support the entire vaporizer within the hood D by a metallic sleeve I which is secured in the hood by a nut $i$. The vaporizer H is fitted on this tube, and it is clamped thereto by the nuts $i'$. The tube I provides for the passage therethrough of the electric conductors $j\ j$ which are covered by suitable insulating material $j'$, the latter being adapted to resist the action of the heat, and also insulate the conductors from metallic contact with the tube I. The conductors $j$ are attached to the respective ends of the resistance coil $h$, one of said conductors serving as the feed to said resistance coil and the other operating as the return connection for said coil. It is to be understood that an electric current from any suitable or appropriate source of supply may be supplied to the conductors $j$ and the resistance $h^2$.

The piston cylinder A is shown as being equipped with an igniter K, the latter being of any suitable or approved construction.

When the engine is started the several parts thereof are in a cold state, and it is necessary to heat up one or more of said parts for the purpose of vaporizing the combustible liquid. Ordinarily combustion engines are heated by exposing a quantity of combustible liquid and applying a lighted match or torch thereto, the flame from the liquid serving to heat up the parts sufficiently to effect the vaporization of the liquid which is subsequently admitted in the cylinder of the engine. This operation of heating up one or more of the parts necessarily consumes a certain amount of time, and it is the purpose of our invention to overcome this objection and to quickly heat up the vaporizing surface by the action of an electric current when the engine is started in operation.

An engine equipped with our vaporizer may be brought into service without appreciable loss of time by simply admitting a current of electric energy to the resistance $h^2$, the heat developed in which is at once absorbed by the metallic masses $h\ h'$. The engine is "cranked" or otherwise started in operation, and a jet of combustible vapor is forced through the nozzle F against and through the diaphragm G, so as to produce a spray which is brought in contact with one or both members $h\ h'$ of the vaporizer, whereby the liquid spray is at once converted into a vapor. Simultaneously with the operation of converting the spray into a vapor, air is admitted by the valve or regulator E to the chamber $d$ and the piston $a$ is moved inwardly so as to create a suction in the chamber A sufficient to open the intake valve C. The vapor resulting from the conversion of the combustible liquid is combined with air which is admitted by the valve E, thus producing the combustible vapor which is supplied to the cylinder A when the valve C is opened, and on the next up stroke of the piston the combustible vapor or charge is compressed by said piston and is exploded by the portion of the igniter K, whereby the piston is forced outwardly by the pressure resulting from the explosion of the exploded charge. It is necessary only to supply the combustible liquid to the vaporizer H for 3 or 4 times when starting the engine, and said engine is heated by the exploded charge so that the combustible liquid is converted into vapor within the chamber $d$ of the hood, which vapor is mixed with air to produce the combustible charge adapted to be supplied to the piston cylinder A as the engine continues in operation.

The embodiment of the invention shown by Fig. 2 is quite similar to that heretofore described in connection with Fig. 1, but under similar circumstances it is advisable to initially heat the combustible liquid before or at the time of its admission to the mixing chamber $d$. For this purpose we prefer to provide means for electrically heating the jet nozzle F, and in Fig. 2 said nozzle is shown as having a resistance coil $F^2$ which is included in an electric circuit $f'$. The resistance coil $F^2$ develops heat when an electric current is passed therethrough, and this heat is communicated directly to the nozzle F', whereby liquid passing through said nozzle absorbs the heat thereof.

In Figs. 9 and 10 of the drawings we have represented another form of the electrically heated vaporizer which is indicated in its entirety by H'. This heater consists of complemental metallic plates $h\,h'$ adapted to be fastened together by rivets, screws or the like $h^5$. The resistance coil $h^2$ is wound on core $h^4$ consisting of a layer of mica as indicated by dotted lines in Fig. 9. In Figs 1, 2, and 8 the resistance is represented as a fine metallic wire, but in Figs. 9 and 10 the resistance $h^2$ is a flat metallic ribbon. The resistance and its core are placed between the metallic masses $h\,h'$, and they are insulated electrically therefrom by layers $h^3$ of mica. It will be understood that the mica insulating layers, the resistance ribbon, and the core on which said ribbon is coiled are clamped firmly together between the metallic masses. The layers $h^3$ insulate the resistance from direct metallic contact with said masses $h\,h'$, and said insulating layers are composed of very thin pieces of mica which permits the heat of the resistance to pass practically unobstructed to the metallic masses, the latter absorbing the heat as fast as it is developed in said coil. In said Figs. 9 and 10 the electrically heated vaporizer is directly in the path of a jet of combustible liquid adapted to be supplied by the nozzle F against one side or face of the vaporizer.

Figs. 11 and 12 represent another embodiment of the vaporizer consisting of a plurality of electrically heated members or units $H^2$ which are arranged in parallel relation and are adapted to be supplied independently of each other with an electric current. Each unit $H^2$ consists of one or more metallic masses, and the resistance $h^2$ clamped between, and insulated electrically from said metallic masses. The circuit wire $j^2$ has a plurality of switches $j^3$ adapted to make contact individually with the resistances of the units $H^2$, the latter having a common return connection $j^4$. It will be seen that the switches $j$ may be individually adjusted to include any one or more of the units $H^2$ in the electric circuit for the purpose of increasing or decreasing the capacity of the vaporizer. In the construction shown by Figs. 1, 2, 9 and 10 the jet nozzle F is arranged to direct the liquid against one side of the vaporizer, but owing to the parallel arrangement of the units $H^2$ in the construction of Figs. 11 and 12, it is desirable to arrange the jet nozzle $F^3$ to direct the combustible liquid against the edge portions of the units $H^2$, whereby the spray of combustible liquid is adapted to pass between said units and to be converted into vapor by the heat thereof.

The electric vaporizers heretofore described and shown in Figs. 1, 2, 3, and 9 to 12, inclusive are intended to be placed in the mixing chamber $d$ of the engine, but this particular location of the vaporizer is not important for the reason that said vaporizer may be employed internally of the combustion or piston cylinder A. In Figs. 4 to 8 inclusive, of the drawings we have shown various embodiments of our vaporizer adapted for internal use in the combustion chamber, and we will now proceed to describe the various types of vaporizers shown in said figures of the drawings.

The vaporizer $H^4$ of Fig. 4 is arranged in the path of a mixture of air and combustible liquid, the liquid being forced into the chamber $d$ and being held in suspension mechanically in the air. The vaporizer $H^4$ is composed of metallic plates or masses adapted to clamp between themselves an electrical resistance which is insulated from metallic contact with the said plates or masses in the manner heretofore described. Any suitable means may be employed for supporting said vaporizer $H^4$ in the path of the inflowing charge, but as shown the vaporizer is suspended below the intake valve C by hangers $m$, the latter being attached in a suitable way to the head B of the cylinder. The conductor $j$ for supplying and returning the current may be led through insulating bushings $m'$ and $m^2$, the latter being secured to the cylinder head B and to the hood D.

The operation of the construction shown by Fig. 4 is, in the main, similar to that described in connection with Fig. 1. The air is admitted by the valve or regulator E and a combustible liquid is supplied by the nozzle F, the air and liquid spray being mixed in the chamber $d$. Before starting the engine the electric current is admitted to the resistance of the vaporizer $H^4$ for the purpose of initially heating the latter, and when the engine is "cranked" the valve C is opened and the mixture of air and combustible liquid is drawn into the cylinder A. As said mixture flows inwardly it strikes the hot surface of said vaporizer $H^4$ and is converted into a vapor or gas, the latter being compressed on the up stroke of the engine piston $a$ so as to be exploded by the igniter K.

Fig. 5 represents another form of vaporizer which is electrically heated at the beginning of the operation, and which is constructed for the circulation of a cooling medium therethrough when the engine is heated up and continued in operation. The vaporizer $H^5$ is represented as a ring or annulus which is suspended from or attached to the cylinder head B in any suitable way, said annular vaporizer being in the path of the charge admitted by the intake valve C. The annular vaporizer is provided in its lower portion with a recess $n$ which is adapted to receive the electric heating appliance heretofore described as consisting of resistance wire or ribbon which is insulated from metallic contact with the body or mass of metal by interposed layers of mica, said resistance wire being indicated by dotted lines in Fig. 5 and adapted to be supplied with an electric current through the conductors $j$. The annular vaporizer is, furthermore, provided with a space or chamber $o$ which is adapted to communicate by passages $o'$ in the cylinder head B for the purpose of establishing a communication between the water circulating chamber $d'$ and the chamber $o$ of said vaporizer, whereby the water or other cooling medium may be caused to circulate through the vaporizer $H^5$ when the engine is in service.

The operation of the vaporizer, shown in Fig. 5, is similar to that described in connection to the construction of Fig. 4. When the valve C is opened, the mixture of air and combustible liquid flows into the open space of the vaporizer, the inclined surface of said valve C operating to direct the aforesaid mixture into contact with the inner surface of said vaporizer $H^5$. It should be understood that the vaporizer $H^6$ is heated by an electric current before the engine is started, so that the mixture of air and liquid will be converted into vapor when supplied to the engine cylinder, but after the engine is once in operation the current is cut off from the vaporizer, and the water circulating through the cylinder head B is free to flow through the chamber $o$ of said vaporizer, thereby preventing deterioration of the latter.

In Fig. 6 we have shown the intake valve $C'$ constructed to serve as a vaporizer for an engine operating as heretofore described in connection with Fig. 4. The valve $C'$ is provided with a member $p$ and with a hollow valve stem $p'$. The member $p$ may be made in one piece with the valve $C'$ and it constitutes one of the metallic masses of our vaporizer. The other mass or member $p^2$ of the vaporizer is clamped by suitable means to the member $p$, and between said members $p$ $p^2$ is confined the electrical resistance $p^3$ which is adapted to be supplied with an electric current through the conductors $p^5$ which are led or carried through the hollow valve stem $p'$. The electric current is supplied to the resistance $p^3$ before starting the engine for the purpose of heating up the members $p$ $p^2$, and when the valve $C'$ is opened the mixture of air and liquid is brought into contact with the vaporizer so as to convert the liquid into the combustible vapor.

Another form of electrically heated and water cooled vaporizer is shown in Figs. 7 and 8 of the drawings, wherein we employ concentric tubes $q$ $q'$ with an electrical resistance $q^2$, confined between said concentric tubes. Preferably, the tubes are bent into the annular form shown in Fig. 8, and the inner tube $q$ is provided with the vertical legs $r$ $r'$, whereby said legs may extend through the cylinder head B, and connected with a circulating pipe R, the latter being equipped with a suitable controlling valve $r^2$. The resistance $q^2$ is coiled or wound around the inner tube $q$, a layer of insulating material $s$ being disposed between said tube $q$ and the resistance, as shown by the drawings. The tube $q'$ incloses the resistance and the tube $q$, and said resistance is insulated electrically from the tube $q'$ by another layer of mica $s'$. In practice we prefer to employ two copper tubes, one of which is of smaller diameter than the other, and while the tubes are in straight conditions, we apply the insulating layers to the smaller tube. The resistance wire or ribbon is now coiled on the insulating layer $s$, and then the other insulating layer $s'$ is wrapped around the resistance, after which the prepared inner tube, the resistance and the insulating layers are inclosed within the outer tube $q'$, and finally the assembled parts are bent to the annular or ring like form shown in the drawings. The ends of the inner tube q are bent to form the hollow legs r r', and the vaporizer is now in condition for installation in the engine cylinder. Said vaporizer may be supported or suspended on the head B by the hangers t or their equivalents, and said vaporizer is below the intake valve C so as to be in the path of the inflowing charge of air and liquid. When the engine is started the electric current is admitted to the resistance $q^2$ for the purpose of heating the tubes q q' so that on the admission of the mixture to the engine cylinder the combustible liquid of said mixture is converted into a vapor by contact with the vaporizer. After the engine is started the current is cut off from the resistance $q^2$ and the vaporizer becomes heated by the ignition of the explosive charges admitted to the engine cylinder. At this time the valve $r^2$ may be opened and a cooling medium, such as water, may be caused to circulate through the inner tube q of the vaporizer, whereby the latter is cooled and kept from deteriorating by the action of the heat thereof.

Having thus fully described the invention, what we claim as new, and desire to secure by Letters Patent is:

1. A vaporizer for internal combustion engines comprising a chamber, a partition composed of perforated material in said chamber, means for supplying a liquid combustible to said chamber on one side of the partition therein, an electrically heated vaporizing element in the chamber on the other side of said partition, and means for admitting air to the chamber.

2. A vaporizer for internal combustion engines comprising a chamber, means for spraying a liquid combustible therein, an electrically heated vaporizing element positioned in the chamber, and means for breaking up the spray, said means being intermediate said vaporizing element and the liquid combustible spraying means.

3. A vaporizer for internal combustion engines comprising a chamber provided with an air inlet, an electrically-heated vaporizing element positioned in the chamber in proximity to the air inlet thereto, means for supplying a liquid combustible to said chamber, and a perforated partition positioned in the chamber intermediate the vaporizing element and said liquid combustible supply means.

4. A starting vaporizer for internal combustion engines comprising a chamber provided with an air inlet, an electrically-heated vaporizing element positioned in said chamber, means for supplying a liquid combustible to said chamber, a foraminous partition intermediate the vaporizing element and the liquid combustible supply means, and an outlet for the resulting gaseous mixture of vapor and air, said outlet being in communication with the chamber at one side of the foraminous partition therein.

5. A vaporizer for internal combustion engines comprising a chamber provided with an air inlet, means for spraying a liquid combustible into said chamber, a valved outlet for a combustible mixture, said outlet being in communication with said chamber, an electrically heated starting vaporizing member within said chamber, and a partition of foraminous material positioned in the chamber intermediate the air inlet and the outlet for the gaseous mixture, said partition being in the path of a jet of liquid combustible adapted to be supplied to the chamber.

6. A vaporizer for internal combustion engines comprising a chamber provided with an air inlet, means for spraying a liquid combustible into said chamber, and a starting vaporizing member positioned in the chamber and presenting a surface for contact with a liquid combustible, said vaporizing member comprising metallic plates forming a mass of heat-absorbing metal, a hollow support for said plates, an insulated electrical resistance held between, and in contact with, said plates, and conductors extending through said hollow support to a point externally of the metallic plates and connected to the aforesaid electrical resistance.

7. A vaporizer for internal combustion engines comprising a chambered casing provided with an air inlet, means for supplying a liquid combustible to said chamber, a perforated partition positioned in the chamber intermediate the air inlet and said liquid combustible supply means, an outlet for a combustible mixture, said outlet communicating with said chamber, and an electrically heated starting vaporizer member having a mass of heat-absorbing metal exposed for contact with said liquid combustible.

In testimony whereof we have signed our names to this specification in the presence of two subscribing witnesses.

HARRY HERTZBERG.
ABBOT AUGUSTUS LOW.

Witnesses:
H. I. BEMFORD,
GEO. WELLING GIDDINGS.